US010626522B2

(12) United States Patent
Dahringer et al.

(10) Patent No.: US 10,626,522 B2
(45) Date of Patent: Apr. 21, 2020

(54) POLYMER FIBRE HAVING IMPROVED DISPERSIBILITY

(71) Applicant: Trevira GmbH, Bobingen (DE)

(72) Inventors: Jorg Dahringer, Bobingen (DE); Michael Klanert, Schwabmunchen (DE); Thomas Hesse, Kleinbartloff (DE)

(73) Assignee: Trevira GmbH, Bobingen (DE)

( * ) Notice: Subject to any disclaimer, the term of this patent is extended or adjusted under 35 U.S.C. 154(b) by 192 days.

(21) Appl. No.: 15/302,184

(22) PCT Filed: Mar. 20, 2015

(86) PCT No.: PCT/EP2015/055966
§ 371 (c)(1),
(2) Date: Dec. 14, 2016

(87) PCT Pub. No.: WO2015/154971
PCT Pub. Date: Oct. 15, 2015

(65) Prior Publication Data
US 2017/0121860 A1    May 4, 2017

(30) Foreign Application Priority Data

Apr. 7, 2014   (DE) .................. 10 2014 004 928
Oct. 16, 2014  (DE) .................. 10 2014 015 258

(51) Int. Cl.
*D01F 6/92*    (2006.01)
*D01F 1/10*    (2006.01)
(Continued)

(52) U.S. Cl.
CPC .................. *D01F 6/92* (2013.01); *C08K 3/36* (2013.01); *C08K 9/06* (2013.01); *D01F 1/10* (2013.01);
(Continued)

(58) Field of Classification Search
CPC ..... C08G 77/00; C08G 2261/63; C08L 83/00; C08L 67/00
See application file for complete search history.

(56) References Cited

U.S. PATENT DOCUMENTS 4,472,556 A * 9/1984 Lipowitz ............... C08L 101/00
                                                      264/210.6
4,640,962 A * 2/1987 Ostrozynski ......... C08G 77/445
                                                        428/391
(Continued)

FOREIGN PATENT DOCUMENTS

EP      0843029 A1    5/1998
JP      S60 81313 A   5/1985
(Continued)

OTHER PUBLICATIONS

Carraher's Polymer Chemistry, Taylor and Francis, Chapter 11.3.1, Organometallic and Inorganic-Organic Polymers, Polysiloxanes, pp. 401-404, www.knovel.com, copyright 2014 (Year: 2014).*
(Continued)

*Primary Examiner* — Jennifer A Steele
(74) *Attorney, Agent, or Firm* — Hammer & Associates, P.C.

(57) ABSTRACT

The invention relates to a polymer fibre with improved dispersibility, a method for producing said fibre and the use of said fibre.
The polymer fibre according to the invention comprises at least one synthetic polymer and 0.1 and 20 wt. % of a silicone. The polymer forming the fibre forms a solid dispersion medium at room temperature (25° C.) for the silicone present in solid form also at room temperature (25° C.) which forms the more disperse phase.
The polymer fibre according to the invention possesses an improved dispersibility and is therefore suitable for produc-
(Continued)

Fibre according to the invention

Figure 1A:
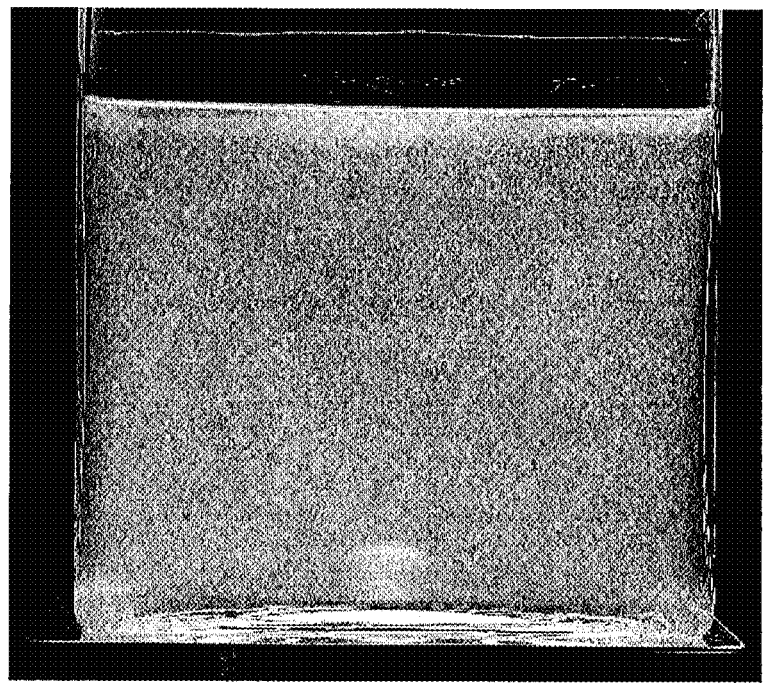

The same fibre without the additive according to the invention ing aqueous suspensions which are used, for example, in the formation of textile fabrics, e.g. nonwovens.

15 Claims, 3 Drawing Sheets

(51) Int. Cl.
    *D04H 1/435*      (2012.01)
    *D01F 6/96*      (2006.01)
    *D01F 8/14*      (2006.01)
    *D01F 8/18*      (2006.01)
    *D04H 1/732*      (2012.01)
    *D01F 6/62*      (2006.01)
    *D01F 6/76*      (2006.01)
    *C08K 9/06*      (2006.01)
    *C08K 3/36*      (2006.01)

(52) U.S. Cl.
    CPC ............... *D01F 6/96* (2013.01); *D01F 8/14* (2013.01); *D01F 8/18* (2013.01); *D04H 1/435* (2013.01); *D04H 1/732* (2013.01); *D01F 6/625* (2013.01); *D01F 6/76* (2013.01); *Y10T 428/2927* (2015.01)

(56) References Cited

U.S. PATENT DOCUMENTS

| | | | | |
|---|---|---|---|---|
| 4,758,637 A | * | 7/1988 | Merrifield | C08G 63/00 428/391 |
| 4,818,614 A | * | 4/1989 | Fukui | A61K 8/11 106/481 |
| 5,225,263 A | * | 7/1993 | Baravian | D01F 1/10 156/62.4 |
| 5,344,862 A | * | 9/1994 | Nohr | C08K 3/36 523/212 |
| 5,521,238 A | * | 5/1996 | Ona | C09D 183/04 524/157 |
| 5,667,750 A | | 9/1997 | Nohr et al. | |
| 5,763,334 A | * | 6/1998 | Gupta | D01F 6/46 428/359 |
| 6,838,173 B2 | * | 1/2005 | Naruse | D01F 1/10 428/372 |
| 7,585,494 B2 | * | 9/2009 | Lange | A61K 8/416 252/8.63 |
| 2003/0120355 A1 | * | 6/2003 | Hafeli | A61K 51/1251 700/1 |
| 2008/0152908 A1 | * | 6/2008 | Nakazaki | A01K 91/00 428/395 |
| 2011/0268919 A1 | * | 11/2011 | Sandmeyer | C08J 3/03 428/143 |
| 2011/0313114 A1 | * | 12/2011 | Soyama | C08G 63/08 525/450 |

FOREIGN PATENT DOCUMENTS

| | | | |
|---|---|---|---|
| JP | 2004 168862 A | | 6/2004 |
| JP | 2008063697 A | * | 3/2008 |
| JP | 2008 208161 A | | 9/2008 |
| UA | 66395 C2 | | 12/2002 |

OTHER PUBLICATIONS

"Polyesters, Thermoplastic", wileyonline, Encyclopedia of Polymer Science and Technology, copyright John Wiley & Sons, Inc,Jul. 2002 (Year: 2002).*

Bremner and Rudin, "Melt Flow Index Values and Molecular Weight Distributions of Commercial Thermoplastics", Journal of Applied Polymer Science (Year: 1990).*

* cited by examiner

Fibre according to the invention

The same fibre without the additive according to the invention

Fibre according to the invention

The same fibre without the additive according to the invention

Fibre according to the invention

The same fibre without the additive according to the invention

POLYMER FIBRE HAVING IMPROVED DISPERSIBILITY

The invention relates to a polymer fibre with improved dispersibility, a method for the production thereof and use thereof.

Polymer fibres, i.e. fibres based on synthetic polymers are produced industrially on a large scale. In this case, the basic synthetic polymer is produced by means of a melt spinning process. To this end the thermoplastic polymeric material is fused and guided by means of an extruder in the liquid state into a spinning beam. From this spinning beam the molten material is fed to so-called spinning nozzles. The spinning nozzle usually comprises a spinning nozzle plate provided with a plurality of bores from which the individual capillaries (filaments) of the fibres are extruded. In addition to the melt spinning process, wet or solvent spinning processes are also used to produce spun fibres. In this case, instead of the melt, a highly viscous solution of a synthetic polymer is extruded through nozzles with fine bores. Both methods are designated by the person skilled in the art as so-called multi-position spinning processes.

The polymer fibres produced in such a manner are used for textile and/or technical applications. In this case it is an advantage if the polymer fibres have a good dispersibility in aqueous systems, e.g. during the production of wet-laid nonwovens. Furthermore, it is advantageous for textile applications if the polymer fibres have a good and soft grip.

The modification or equipment of polymer fibres for the respective end application or for the necessary intermediate treatment steps, e.g. stretching and/or crimping, is usually accomplished by applying suitable finishes or layers which are applied to the surface of the finished polymer fibre or polymer fibre to be treated.

Another possibility for chemical modification can be accomplished on the polymer basic structure itself, for example, by incorporating compounds having a flaming action into the polymer main and/or side chain.

Furthermore, additives, for example, antistatics or dye pigments can be introduced into the molten thermoplastic polymer or introduced into the polymer fibre during the multi-position spinning process.

The dispersion behaviour of a polymer fibre is influenced, inter alia, by the nature of the synthetic polymers. In particular in the case of fibres of thermoplastic polymer, the dispersibility in aqueous systems is therefore influenced and adjusted by the finishes or layers applied to the surface.

The dispersibility produced or improved by means of suitable finishes or layers is already sufficient for many textile applications. For industrial applications, in particular in those in which the polymer fibre is present or must be present in dispersed form for a fairly long time and/or under more extreme conditions, e.g. high pressure, strong shear forces and elevated temperature, in particular in aggressive, acidic, aqueous systems, the dispersibility [achieved] by means of the superficially applied finishes or layers is inadequate and in need of improvement.

It is therefore the object to provide a polymer fibre with improved dispersibility, in particular long-term dispersibility, which is also readily dispersible under extreme conditions, i.e. high pressure, severe shear forces and elevated temperature, in particular also in aggressive aqueous systems which optionally have a pH of <7 and/or electrolytes, in particular saline-based electrolytes.

The aforesaid object is solved by a polymer fibre according to the invention comprising at least one synthetic polymer, preferably at least one thermoplastic polymer, characterized in that the polymer forming the fibres in the form of a solid dispersion medium at room temperature (25° C.) comprises between 0.1 and 20 wt. % of a silicone in the form of a solid more disperse phase at room temperature (25° C.)

Figure 1B:
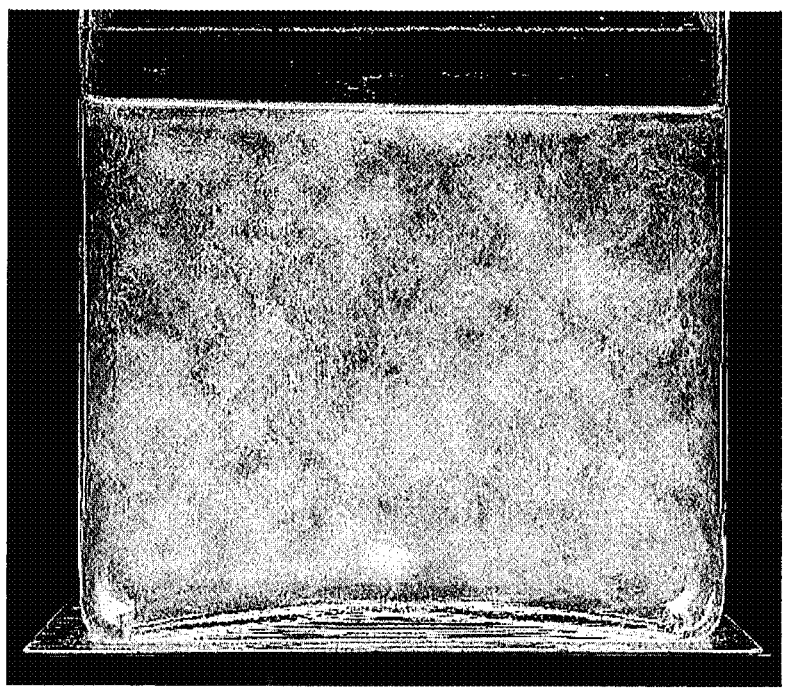
Figure 2A:
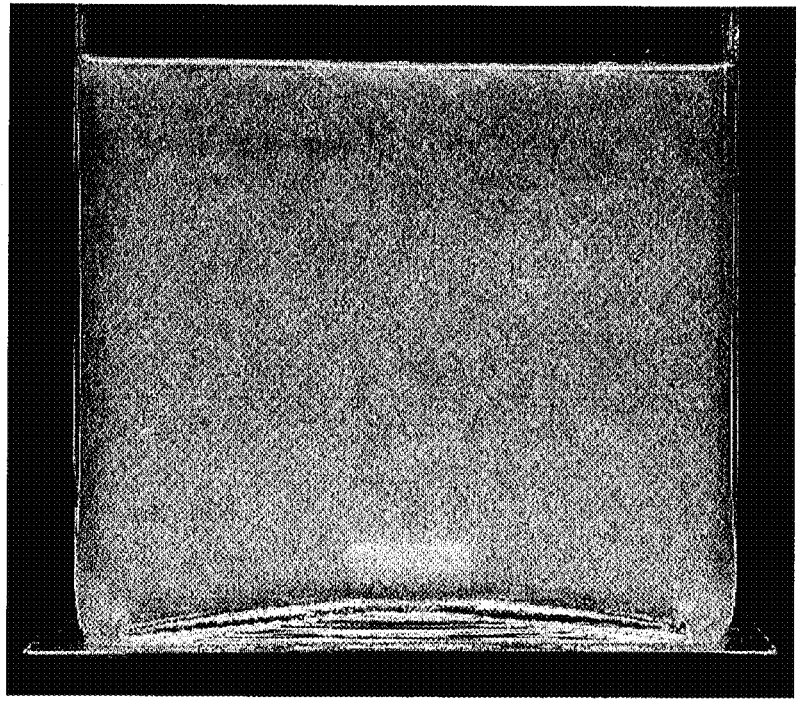
Figure 2B:
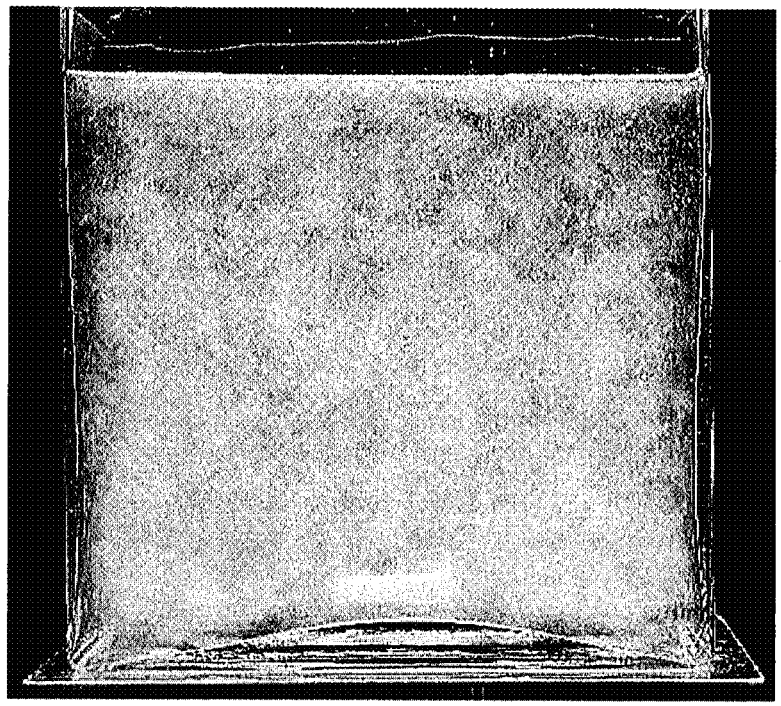
Figure 3A:
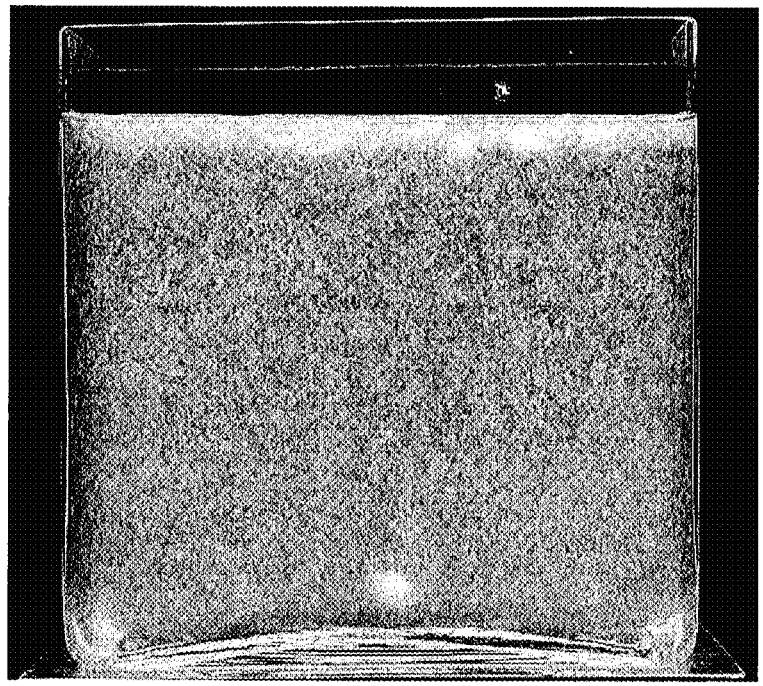
Figure 3B:
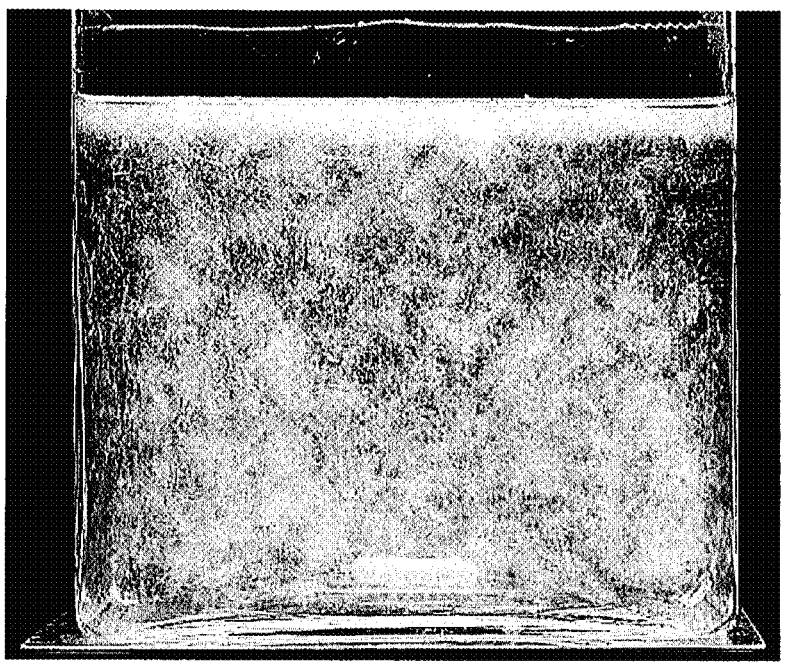

In the drawings, FIGS. 1A and 1B are photographs illustrating a comparison mentioned in Example 1, FIGS. 2A and 2B are photographs illustrating a comparison mentioned in Example 2, and FIGS. 3A and 3B are photographs illustrating a comparison mentioned in Example 3.

Polymers

The synthetic polymers according to the invention which form the dispersion medium, preferably comprise thermoplastic polymers, in particular thermoplastic polycondensates, particularly preferably so-called synthetic biopolymers, particularly preferably thermoplastic polycondensates based on so-called biopolymers.

The term "thermoplastic polymer" designates in the present invention a plastic which can be deformed in a specific temperature range, preferably in the range of 25° C. to 350° C., (thermoplastic). This process is reversible, that is, it can be repeated arbitrarily frequently by cooling and re-heating as far as into the molten state as long as the so-called thermal decomposition of the material is not initiated by overheating. This is the difference between thermoplastic polymers and thermosetting plastics and elastomers.

Within the framework of the present invention, the following polymers are preferably understood by the term "thermoplastic polymer":

acrylonitrile ethylene propylene (diene) styrene copolymer, acrylonitrile methacrylate copolymer, acrylonitrile methyl methacrylate copolymer, acrylonitrile chlorinated polyethylene styrene copolymer, acrylonitrile butadiene styrene copolymer, acrylonitrile ethylene propylene styrene copolymer, aromatic polyester, acrylonitrile styrene acryloester copolymer, butadiene styrene copolymer, cellulose acetate, cellulose acetobutyrate, cellulose acetopropionate, hydrated cellulose, carboxymethyl cellulose, cellulose nitrate, cellulose propionate, cellulose triacetate, polyvinylchloride, ethylene acrylic acid copolymer, ethylene butylacrylate copolymer, ethylene chlorotrifluoroethylene copolymer, ethylene ethylacrylate copolymer, ethylene methacrylate copolymer, ethylene methacrylic acid copolymer, ethylene tetrafluoroethylene copolymer, ethylene vinylalcohol copolymer, ethylene butene copolymer, ethylcellulose, polystyrene, polyfluoroethylene propylene, methylmethacrylate acrylonitrile butadiene styrene copolymer, methylmethacrylate butadiene styrene copolymer, methylcellulose, polyamide 11, polyamide 12, polyamide 46, polyamide 6, polyamide 6-3-t, polyamide 6-terephthalic acid copolymer, polyamide 66, polyamide 69, polyamide 610, polyamide 612, polyamide 6i, polyamide mxd 6, polyamide pda-t, polyamide, polyarylether, polyaryletherketone, polyamide imide, polyarylamide, polyamino-bis-maleimide, polyarylate, polybutene-1, polybutylacrylate, polybenzimidazole, poly-bis-maleimide, polyoxadiazobenzimidazole, polybutylene terephthalate, polycarbonate, polychlorotrifluoroethylene, polyethylene, polyestercarbonate, polyaryletherketone, polyetheretherketone, polyetherimide, polyetherketone, polyethylene oxide, polyarylethersulfone, polyethylene terephthalate, polyimide, polyisobutylene, polyisocyanurate, polyimide sulfone, polymethacrylimide, polymethacrylate, poly-4-methylpentene-1, polyacetal, polypropylene, polyphenylene oxide, polypropylene oxide, polyphenylene sulfide, polyphenylene sulfone, polystyrene, polysulfone, polytetrafluoroethylene, polyurethane, polyvinylacetate, polyvinylalcohol, polyvinylbutyral, polyvinylchloride, polyvinylidene chloride, polyvinylidene fluoride, polyvinylfluoride, polyvinylmethylether, polyvinylpyrrolidone, styrene butadiene copolymer, styrene isoprene copolymer, styrene maleic acid anhydride copolymer, styrene maleic acid anhydride butadiene copolymer, styrene methylmethacrylate copolymer, styrene methylstyrene copolymer, styrene acrylonitrile copolymer, vinylchloride ethylene copolymer, vinylchloride methacrylate copolymer, vinylchloride maleic acid anhydride copolymer, vinylchloride maleimide copolymer, vinylchloride methylmethacrylate copolymer, vinylchloride octylacrylate copolymer, vinylchloride vinylacetate copolymer, vinylchloride vinylidene chloride copolymer and vinylchloride vinylidene chloride acrylonitrile copolymer.

Particularly well-suited are high-melting thermoplastic polymers (Mp≤100° C.) which are very well suited for spun fibre production. Suitable high-melting thermoplastic polymers are, for example, polyamides such as, for example, polyhexamethylene adipinamide, polycaprolactam, aromatic or partially aromatic polyamides ("aramide"), aliphatic polyamides such as, for example, Nylon, partially aromatic or fully aromatic polyesters, polyphenylene sulfide (PPS), polymers with ether and keto groups such as, for example, polyetherketone (PEK) and polyether etherketone (PEEK) or polyolefins such as, for example, polyethylene or polypropylene.

Within the high-melting thermoplastic polymers, melt-spinnable polymers are particularly preferred.

Melt-spinnable polyesters consist predominantly of building blocks which are derived from aromatic dicarboxylic acids and aliphatic diols. Common aromatic dicarboxylic acid building blocks are the divalent radicals of benzene dicarboxylic acids, in particular terephthalic acid and isophthalic acid; common diols have 2 to 4 C atoms, where ethylene glycol and/or propane-1,3-diol are particularly suitable.

Particularly preferred are polyesters having at least 95 mol % polyethylene terephthalate (PET).

Such polyesters, in particular polyethylene terephthalate, usually have a molecular weight corresponding to an intrinsic viscosity (IV) of 0.4 to 1.4 (dl/g), measured for solutions in dichloroacetic acid at 25° C.

The term "synthetic biopolymer" designates in the present invention a material which consists of biogenic raw materials (renewable raw materials). A delimitation is thus made from the conventional petroleum-based materials or plastics such as, for example, polyethylene (PE), polypropylene (PP) and polyvinylchloride (PVC).

According to the invention, particularly preferred synthetic biopolymers are thermoplastic polycondensates based on so-called biopolymers which comprise repeating units of lactic acid, hydroxybutyric acid and/or glycolic acid, preferably of lactic acid and/or glycolic acid, in particular of lactic acid. Polylactic acids are particularly preferred in this case.

"Polylactic acid" is understood here as polymers which are constructed of lactic acid units. Such polylactic acids are usually produced by condensation of lactic acids but are also obtained by ring-opening polymerisation of lactides under suitable conditions.

According to the invention, particularly suitable polylactic acids comprise poly(glycolide-co-L-lactide), poly(L-lactide), poly(L-lactide-co-ε-caprolactone), poly(L-lactide-co-glycolide), poly(L-lactide-co-D,L-lactide), poly(D,L-lactide-co-glycolide) as well as poly(dioxanone). Such polymers are available commercially for example from the company Boehringer Ingelheim Pharma KG (Germany) under the trade names Resomer® GL 903, Resomer® L 206 S, Resomer® L 207 S, Resomer® L 209 S, Resomer® L 210, Resomer® L 210 S, Resomer® LC 703 S, Resomer® LG 824 S, Resomer® LG 855 S, Resomer® LG 857 S, Resomer® LR 704 S, Resomer® LR 706 S, Resomer® LR 708, Resomer® LR 927 S, Resomer® RG 509 S and Resomer® X 206 S.

For the purposes of the present invention, particularly advantageous polylactic acids are in particular poly-D-, poly-L- or poly-D,L-lactic acids.

In a particularly preferred embodiment the synthetic polymer forming the dispersion medium is a thermoplastic condensate based on lactic acids.

The polylactic acids used according to the invention have a number average molecular weight (Mn), preferably determined by gel permeation chromatography against narrowly distributed polystyrene standards or by end-group titration, of min. 500 g/mol, preferably min. 1,000 g/mol, particularly preferably min. 5,000 g/mol, expediently min. 10,000 g/mol, in particular min. 25,000 g/mol. On the other hand, the number average is preferably max. 1,000,000 g/mol, expediently max. 500,000 g/mol, more favourably max. 100,000 g/mol, in particular max. 50,000 g/mol. A number average molecular weight in the range from min. 10,000 g/mol to 500,000 g/mol has proved quite particularly successful within the framework of the present invention.

The weight average molecular weight (Mw) of preferred lactic acid polymers, in particular of poly-D-, poly-L- or poly-D,L-lactic acids, preferably determined by gel permeation chromatography against narrowly distributed polystyrene standards, lies preferably in the range from 750 g/mol to 5,000,000 g/mol, preferably in the range from 5,000 g/mol to 1,000,000 g/mol, particularly preferably in the range from 10,000 g/mol to 500,000 g/mol, in particular in the range from 30,000 g/mol to 500,000 g/mol, and the polydispersity of these polymers is more favourably in the range from 1.5 to 5.

The inherent viscosity of particularly suitable lactic acid polymers, in particular poly-D-, poly-L- or poly-D,L-lactic acids, measured in chloroform at 25° C., 0.1% polymer concentration, lies in the range of 0.5 dl/g to 8.0 dl/g, preferably in the range of 0.8 dl/g to 7.0 dl/g, in particular in the range of 1.5 dl/g to 3.2 dl/g.

Furthermore, the inherent viscosity of particularly suitable lactic acid polymers, in particular poly-D-, poly-L- or poly-D,L-lactic acids, measured in hexafluoro-2-propanol at 30° C., 0.1% polymer concentration, is in the range of 1.0 dl/g to 2.6 dl/g, in particular in the range of 1.3 dl/g to 2.3 dl/g.

Within the framework of the present invention, furthermore polymers, in particular thermoplastic polymers having a glass transition temperature higher than 20° C., more favourably higher than 25° C., preferably higher than 30° C., particularly preferably higher than 35° C., in particular higher than 40° C., are extremely advantageous. Within the framework of a quite particularly preferred embodiment of the present invention, the glass transition temperature of the polymer lies in the range of 35° C. to 55° C., in particular in the range of 40° C. to 50° C.

Furthermore, polymers having a melting point higher than 50° C., more favourably of at least 60° C., preferably higher than 150° C., particularly preferably in the range of 160° C. to 210° C., in particular in the range of 175° C. to 195° C., are particularly suitable.

In this case, the glass temperature and the melting point of the polymer is preferably determined by means of Differential Scanning calorimetry; DSC for short. In this connection, the following procedure has proved quite particularly successful:

Performing the DSC measurement under nitrogen on a Mettler-Toledo DSC 30S. The calibration is preferably made with indium. The measurements are preferably made under dry oxygen-free nitrogen (flow rate: preferably 40 ml/min). The sample weight is preferably selected between 15 mg and 20 mg. The samples are initially heated from 0° C. to preferably a temperature above the melting point of the polymer to be studied, then cooled to 0° C. and heated a second time from 0° C. to the said temperature at a heating rate of 10° C./min.

Polyesters, in particular lactic acid polymers, are quite particularly preferred as thermoplastic polymers.

Polymer Fibre

The polymer fibre according to the invention can be present as a finite fibre, e.g. as so-called staple fibre or as an infinite fibre (filament). For better dispersibility the fibre is preferably present as a staple fibre. The length of the aforesaid staple fibres is not subject to any fundamental restriction but is generally 1 to 200 mm, preferably 2 to 120 mm, particularly preferably 2 to 60 mm. As a result of the combination according to the invention of synthetic polymer as dispersion medium and silicone as more disperse phase, in particular short fibres can be well cut. By this are understood fibre lengths of 5 mm and less, in particular of 4 mm and less.

The individual titre of the polymer fibres according to the invention, preferably stable fibres, is between 0.3 and 30 dtex, preferably 0.5 to 13 dtex. For some applications titres between 0.3 and 3 dtex and fibre lengths of <10 mm, in particular <8 mm, particularly preferably <6 mm, particularly preferably <4 mm, are particularly well suited. The titre was determined in accordance with DIN EN ISO1973.

The polymer fibre can also be present as a bicomponent fibre, where the fibre consists of a component A (core) and a component B (cladding). Component A (core) comprises at least one thermoplastic polymer; component B (cladding) comprises at least one thermoplastic polymer which at room temperature (25° C.) forms the solid dispersion medium for the silicone, where the silicone forms the solid more disperse phase and is present in quantities of 0.1 and 20 wt. % relative to component B. In a further embodiment the silicone which forms the solid more disperse phase is additionally present in the core.

In a further embodiment the melting point of the thermoplastic polymer in component A is at least 5° C., preferably at least 10° C., particularly preferably at least 20° C., higher than the melting point of the thermoplastic polymer in component B. Preferably the melting point of the thermoplastic polymer in component A is at least 100° C., preferably at least 140° C., particularly preferably at least 150° C.

The thermoplastic polymers used in the bicomponent fibres comprise the polymers already mentioned previously.

Silicone

The polymer fibre according to the invention comprises between 0.1 and 20 wt. %, preferably 0.5 to 3 wt. %, of a silicone as disperse phase. The silicone is present at room temperature (25° C.) in the form of dispersed, compacted inclusions which as a result of the thermoplastic processing, e.g. by blending in the melt extruder, are distributed substantially homogeneously in the polymer matrix of the polymer fibres.

In a preferred embodiment the silicone is present in carried form, in particular on a particulate silicate carrier, preferably of silicic acid, in particular on pyrogenic silicic acid, where preferred among the pyrogenic silicic acids are those whose specific surface area determined by BET, is min. 30 m$^2$/g, in particular min. 50 m$^2$/g. Suitable pyrogenic silicic acids are for example, based on Aerosil® (Evonik) or based on HDK (Wacker Chemie AG). The fraction of the carrier is up to 35 wt. % relative to the total amount of silicone plus carrier.

The silicone used as disperse phase according to the invention comprises a silicone polymer. Silicone polymers are understood as polymers of siloxane units in which the silicone atoms are saturated with organic radicals.

The silicone polymers can be present as cyclic polysiloxanes, linear polysiloxanes, branched polysiloxanes, cross-linked polysiloxanes as as mixtures of the aforesaid materials.

Linear polysiloxanes are preferably understood as compounds having the formula:

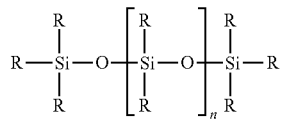

R=C1-C10 hydrocarbon radical, alkyl, aryl etc.

Cyclic polysiloxanes are preferably understood as compounds having the formula:

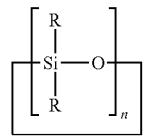

R=C1-C10 hydrocarbon radical, alkyl, aryl etc.

n=is an integer of at least 4, preferably 4, 5 or 6.

Branched polysiloxanes are preferably understood as compounds having the formula:

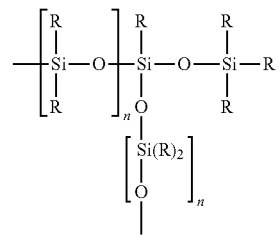

R=C1-C10 hydrocarbon radical, alkyl, aryl etc.

n is the same or different in each case and stands for a number between 10 and 10000.

Cross-linked polysiloxanes are preferably understood as compounds having the formula:

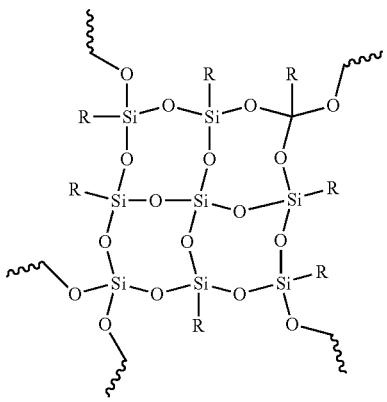

R=C1-C10 hydrocarbon radical, alkyl, aryl etc.

Preferably the silicone polymer used is a linear silicone polymer, preferably a non-cross-linked linear silicone polymer.

Preferably the silicone polymer used is a linear high-molecular silicone polymer, preferably a non-cross-linked linear high-molecular silicone polymer.

The term "high-molecular silicone" is understood in connection with the present invention as a silicone which has a mean molecular weight of at least 100,000 g/mol, preferably at least 150,000 g/mol, particularly preferably at least 200,000 g/mol, and the maximum mean molecular weight is up to 900,000 g/mol, preferably up to 700,000 g/mol, particularly preferably up to 650,000 g/mol, in particular up to 600,000 g/mol.

In a preferred embodiment high-molecular non-cross-linked linear silicone polymers are used whose dynamic viscosity (measured at 25° C. according to DIN 53018) is at least 10,000 Pa*s, preferably at least 15,000 Pa*s, particularly preferably at least 17,500 Pa*s, and a maximum of 60,000 Pa*s, preferably a maximum of 55,000 Pa*s, particularly preferably a maximum of 50,000 Pa*s, in particular a maximum of 45,000 Pa*s.

In order to determine the dynamic viscosity, the ultrahigh-molecular silicone polymer is freed from carrier which may be present. A suitable method is found in FAO JECFA Monographs 5 (2008).

In a preferred embodiment high-molecular non-cross-linked linear silicone polymers are used whose kinetic viscosity measured at 25° C. is at least 10,000,000 cSt, preferably at least 15,000,000 cSt, particularly preferably at least 17,500,000 cSt, and a maximum of 60,000,000 cSt, preferably a maximum of 55,000,000 cSt particularly preferably a maximum of 50,000,000 cSt, in particular a maximum of 45,000,000 cSt.

Examples of preferred high-molecular silicone oils are the commercially available products SS4267 or Baysilone-Oel M 2000000 (Momentive), KF-96H-300000 (Shin-Etsu), PMX-200 Silicone Fluid, 500000 cSt. (Dow Corning), Genioplast (Wacker) and Rhodorsil 0147 V 300000 (Bluestar). Examples of preferred hydroxy-terminated polysiloxanes (PDM-siloxane) are the commercially available products under the CAS number 70131-67-8 Bays. Abhaesive/ Release Coat. ZW PR/OH (Momentive) or UC 107 (UChem).

In a preferred embodiment, high-molecular, non-cross-linked linear silicone polymers are used whose density measured at 25° C. is between 0.76 to 1.07 g/cm$^3$, particularly preferably 0.9 to 1.07 g/cm$^3$, in particular 0.95 to 1.07 g/cm$^3$.

The silicone used as disperse phase in the polymer fibre according to the invention improves the dispersibility of the fibre in water considerably. On the one hand, the fibres according to the invention disperse very rapidly and remain dispersed over a fairly long time. Furthermore, the dispersed fibres are present very uniformly distributed and are also suitable for stabilizing dispersions in which in addition to the fibres according to the invention, solid particulate particles, for example, mineral particles, are additionally present. Polymer fibres according to the invention having a titre between 0.3 and 3 dtext and a fibre length of <10 mm, in particular <8 mm, particularly preferably <6 mm, in particular preferably <4 mm, are suitable for this embodiment.

The silicone used as disperse phase in the polymer fibre according to the invention is added to the fibre-forming polymer (dispersion medium) in the melt. The addition can be made in direct form or by means of so-called master batches.

The synthetic polymer fibre according to the invention is produced by the usual methods. Firstly, the synthetic polymer is dried if necessary and supplied to an extruder. If the silicone is also used as master batch, this is also supplied to the extruder where the supply can be made jointly or separately. Otherwise, the silicone can also be added in the extruder. The molten material is then spun by means of usual devices with appropriate nozzles, where the respective residence times in the extruder as well as the temperatures used are determined by the polymer which forms the dispersion medium. The exit speed at the nozzle outlet surface is matched to the spinning speed so that a fibre with the desired titre is produced.

Spinning speed is understood as the speed at which the solidifed threads are drawn off. The threads drawn off in such a manner can either be fed directly to stretching or only wound or laid down and stretched at a later time point. The fibres and filaments stretched in the usual manner can then be fixed by generally usual methods and cut to the desired length to form staple fibres. The fibres can be uncrimped and also crimped where in the case of the crimped version the crimping must be adjusted for the wet laying method (low crimping).

The fibres formed can have round, oval or other suitable cross-section or have other shapes such as, for example, dumbbell-shaped, kidney-shaped, triangular or tri- or multilobal cross-sections. Hollow fibres are also possible. Fibres of two or more polymers can also be used.

The fibre filaments thus produced are combined to form yarns and these in turn to form tows. The tows are initially laid down in cans for further processing. The tows stored intermediately in the cans are taken up and a large tow is produced. Then, the large tow, these usually have 10-600 ktex, can be stretched using conventional methods on a conveyor line, preferably at 10 to 110 m/min entry speed. Here preparations can be applied which promote the stretching but do not disadvantageously influence the subsequent properties.

The stretching ratios preferably extend from 1.25 to 4, particular from 2.5 to 3.5. The temperature during the stretching lies in the range of the glass transition temperature of the tow to be stretched and for polyester, for example, is between 40° C. and 80° C.

The stretching can be executed as single-stage or if desired using a two-stage stretching process (see on this matter for example U.S. Pat. No. 3,816,486). Before and during the stretching one or more dressings can be applied using conventional methods.

For the crimping/texturing of the stretched fibres which is to be carried out optionally, conventional methods of mechanical crimping using crimping machines known per se can be used. Preferred is a mechanical device for steam-assisted fibre crimping such as, for example, a stuffer box. However, fibres crimped by other methods can also be used, thus for example three-dimensionally crimped fibres. In order to perform the crimping the tow is initially usually tempered to a temperature in the range of 50° to 100° C., preferably 70° to 85° C., particularly preferably to about 78° C. and treated with a pressure of the tow run-in rollers of 1.0 to 6.0 bar, particularly preferably at about 2.0 bar, a pressure in the stuffer box of 0.5 to 6.0 bar, particularly preferably 1.5-3.0 bar, with steam between 1.0 and 2.0 kg/min., particularly preferably 1.5 kg/min.

Then the smooth or optionally crimped fibres are relaxed or fixed at 120° to 170° C. in the furnace or hot air stream.

In order to produce staple fibres, the smooth or optionally crimped fibres are taken up, followed by cutting and optionally hardening and depositing in pressed bales as flock. The staple fibres of the present invention are preferably cut on a mechanical cutting device downstream of the relaxation. In order to produce tow types, the cutting can be dispensed with. These tow types are deposited in bales in uncut form and pressed.

The fibres produced according to the invention in the crimped embodiment preferably have a degree of crimping of at least 2, preferably at least 3 crimps (crimp arcs) per cm, preferably 3 arcs per cm to 9.8 arcs per cm and particularly preferably 3.9 arcs per cm to 8.9 arcs per cm. In applications to produce textile surfaces, values for the degree of crimping of about 5 to 5.5 arcs per cm are particularly preferred. In order to produce textile surfaces by means of wet laying methods, the degree of crimping must be adjusted individually.

The aforesaid parameters spinning speed, stretching, stretching ratios, stretching temperatures, fixing, fixing temperature, run-in speeds, crimping/texturing etc, are determined according to the respective polymer which forms the dispersion medium. These are parameters which the person skilled in the art selects in the usual range.

Textile fabrics can be produced from the fibres according to the invention, which are also the subject of the invention. The textile fabrics produced from the fibres according to the invention can also comprise mixtures of different fibres but according to the invention. The same applies to the aqueous suspensions produced from the fibres according to the invention. As a result of the good dispersibility of the fibres according to the invention, such textile fabrics are preferably produced by wet-laid methods.

In addition to the improved dispersibility of the fibres in water, the polymer fibre according to the invention also exhibits a good pumpability of the dispersed fibres in water so that the polymer fibre according to the invention is particularly well suited for the production of textile fabrics using the wet laying method. Since the fibres according to the invention promote the dispersibility of solid particulate particles, for example, mineral particles, textile fabrics with a mineral finish can also be produced. Polymer fibres according to the invention having a titre between 0.3 and 3 dtex and a fibre length of <10 mm, in particular <8 mm, particularly preferably <6 mm, in particular preferably <4 mm are suitable for this embodiment.

In addition to these wet laying methods, so-called melt-blowing methods (for example, as described in "Complete Textile Glossary, Celanese Acetate LLC, from 2000 or in "Chemiefaser-Lexikon, Robert Bauer, 10th edition, 1993) are also suitable. Such melt blowing methods are suitable for producing fine-titre fibres or nonwovens, e.g. for applications in the hygiene area.

The term "textile fabric" is therefore to be understood within the framework of this description in its broadest meaning. This can comprises all structures containing the fibres according to the invention which have been produced by a surface-forming technique. Examples of such textile fabrics are nonwovens, in particular wet-laid nonwovens, preferably based on staple fibres or nonwovens produced by the melt-blowing method.

The fibres according to the invention are characterized by significantly improved haptics compared with fibres without the additive according to the invention, which is distinguished by an improved softness. This softness is particularly of great importance for applications in which the fibre according to the invention is in contact with the human skin. In particular, fibres based on synthetic biopolymers would be inadequate for such an application or would be declined by the consumer or the manufacturers for end consumer products as a result of the lack of the required softness.

In order to assess the dispersibility, the following test method was developed and used according to the invention:

The fibres according to the invention are cut to a length of 2-12 mm. The cut fibres are introduced at room temperature (25° C.) into a glass container (dimensions: length 150 mm; width 200 mm; height 200 mm), which is filled with VE water (VE=fully desalinated). The quantity of fibres is 0.25 g per litre of VE water. For better assessment usually 1 g of fibres and 4 litre of VE water is used.

The fibre/VE water mixture is then agitated by means of a usual laboratory magnetic agitator (e.g. IKAMAG RCT) and a magnetic fish (80 mm) for at least three minutes (rotational speed in the range of 750-1500 rpm) and the agitator is switched off. It is then assessed whether all the fibres are dispersed.

The dispersion behaviour of the fibres is assessed as follows:
not dispersed (−)
partially dispersed (○)
completely dispersed (+)

The preceding assessment is made after defined time intervals.

A fibre which has no silicone additive according to the invention as disperse phase but is otherwise identical is used as comparison.

The invention is illustrated by the following example without restricting this thereto in its scope.

EXAMPLE 1

1 gram of thermoplastic polymer fibre according to the invention (polyester) having a cut length of 6 mm and a titre of 1.5 dtex (silicone additive 1.5 wt. %) was dispersed at room temperature (25° C.) as described hereinbefore and assessed.

For comparison 1 gram of thermoplastic polymer fibre (polyester) having a cut length of 6 mm and a titre of 1.5 dtext without the addition of silicone additive according to the invention but otherwise identical was dispersed at room temperature (25° C.) as described hereinbefore and assessed.

The results are combined in the following table:

| Dispersion behaviour (after switching off the agitator) | Fibre (according to the invention) | Fibre (comparison) |
|---|---|---|
| 0 min | + | o |
| 1 min | + | o |
| 3 min | + | o |
| 5 min | + | o |
| 10 min | + | o |

FIG. 1 shows the dispersion behaviour directly after switching off the agitator. FIG. 1*a* shows the fibre according to the invention, FIG. 1*b* shows the same fibre without the additive according to the invention.

EXAMPLE 2

1 gram of thermoplastic polymer fibre according to the invention based on a synthetic biopolymer (PLA) having a cut length of 4 mm and a titre of 1.5 dtex (silicone additive 3 wt. %) was dispersed at room temperature (25° C.) as described hereinbefore and assessed.

For comparison 1 gram of thermoplastic polymer fibre according to the invention based on a synthetic biopolymer (PLA) having a cut length of 4 mm and a titre of 1.5 dtex without the addition of silicone additive according to the invention but otherwise identical was dispersed at room temperature (25° C.) as described hereinbefore and assessed.

The results are combined in the following table:

| Dispersion behaviour (after switching off the agitator) | Fibre (according to the invention) | Fibre (comparison) |
|---|---|---|
| 0 min | + | o |
| 1 min | + | o |
| 3 min | + | o |
| 5 min | + | o |
| 10 min | + | o |

FIG. 2 shows the dispersion behaviour directly after switching off the agitator. FIG. 2*a* shows the fibre according to the invention, FIG. 2*b* shows the same fibre without the additive according to the invention.

EXAMPLE 3

1 gram of thermoplastic bicomponent polymer fibre according to the invention (core/cladding 50/50) based on a synthetic biopolymer (PLA) as core and a polyethylene homopolymer as cladding (additive according to the invention in PE cladding, 3 wt. % silicone additive in cladding) having a cut length of 4 mm and a titre of 2 dtex was dispersed at room temperature (25° C.) as described hereinbefore and assessed.

For comparison 1 gram of thermoplastic bicomponent polymer fibre according to the invention (core/cladding 50/50) based on a synthetic biopolymer (PLA) as core and a polyethylene homopolymer as cladding (in each case without the addition of silicone additive) having a cut length of 4 mm and a titre of 2 dtex was dispersed at room temperature (25° C.) as described hereinbefore and assessed.

The results are combined in the following table:

| Dispersion behaviour (after switching off the agitator) | Fibre (according to the invention) | Fibre (comparison) |
|---|---|---|
| 0 min | + | o |
| 1 min | + | o |
| 3 min | + | o |
| 5 min | + | o |
| 10 min | + | o |

FIG. 3 shows the dispersion behaviour directly after switching off the agitator. FIG. 3*a* shows the bicomponent fibre according to the invention, FIG. 3*b* shows the same bicomponent fibre without the additive according to the invention.

The invention claimed is:

1. A polymer fiber comprises: at least one synthetic polymer which is solid at room temperature (25° C.) with between 0.1 and 20 wt. % of a dispersion medium mixed into the at least one synthetic polymer, the dispersion medium comprises a high-molecular non-cross-linked linear silicone polymer which, has a dynamic viscosity measured at 25° C. in accordance with DIN 53018 of at least 10,000 Pa*s, and high-molecular is a mean molecular weight of at least 100,000 g/mol, wherein the silicone polymer is in a form of a particulate silicate carrier.

2. The polymer fiber according to claim 1 wherein the synthetic polymer is a thermoplastic polymer.

3. The polymer fiber according to claim 2 wherein the thermoplastic polymer is a thermoplastic polycondensate.

4. The polymer fiber according to claim 3 wherein the thermoplastic polycondensate is a biopolymer.

5. The polymer fiber according to claim 4 wherein the biopolymer is a lactic acid.

6. The polymer fiber according to claim 5 wherein the lactic acid is a polylactic acid with a number average molecular weight (Mn) between 10,000 g/mol and 500,000 g/mol.

7. The polymer fiber according to claim 5 wherein the lactic acid is a polylactic acid with a weight average molecular weight (Mw) between 30,000 g/mol and 500,000 g/mol.

8. The polymer fiber according to claim 1 wherein the silicone polymer comprises a linear polysiloxane.

9. The polymer fiber according to claim 1 wherein the silicone polymer has a dynamic viscosity measured at 25° C. in accordance with DIN 53018 of at least 15,000 Pa*s, and a maximum of 60,000 Pa*s.

10. The polymer fiber according to claim 1 wherein the silicone polymer has a kinematic viscosity measured at 25° C. of at least 10,000,000 cSt, and a maximum of 60,000,000 cSt.

11. The polymer fiber according to claim 1 wherein the fiber has a titre between 0.3 and 30 dtex, and the fiber is a staple fiber or a crimped staple fiber.

12. The polymer fiber according to claim 1 wherein the fiber is a bicomponent fiber with a core and a cladding, comprises: at least one synthetic polymer which is solid at room temperature (25° C.) with between 0.1 and 20 wt. % of a solid dispersion medium mixed into the at least one synthetic polymer, the solid dispersion medium comprises a high-molecular non-cross-linked linear silicone polymer is solid at room temperature (25° C.) and has a dynamic viscosity measured at 25° C. in accordance with DIN 53018 of at least 10,000 Pa*s.

13. The polymer fiber according to claim 1 wherein the solid dispersion medium comprises between 0.5 and 3 wt. % of the polymer fiber.

14. The polymer fiber according to claim 1 wherein the particulate silicate carrier is pyrogenic silicic acid.

15. A textile fabric comprising the polymer fiber of claim 1.

* * * * *